(12) United States Patent
Kravets et al.

(10) Patent No.: US 10,318,890 B1
(45) Date of Patent: Jun. 11, 2019

(54) TRAINING DATA FOR A MOTION DETECTION SYSTEM USING DATA FROM A SENSOR DEVICE

(71) Applicant: Cognitive Systems Corp., Waterloo (CA)

(72) Inventors: Oleksiy Kravets, Petersburg (CA); Mikhail Ravkine, Waterloo (CA)

(73) Assignee: Cognitive Systems Corp., Waterloo (CA)

( * ) Notice: Subject to any disclaimer, the term of this patent is extended or adjusted under 35 U.S.C. 154(b) by 0 days.

(21) Appl. No.: 15/987,805

(22) Filed: May 23, 2018

(51) Int. Cl.
*G06N 20/00* (2019.01)
*H04W 4/38* (2018.01)

(52) U.S. Cl.
CPC .............. *G06N 20/00* (2019.01); *H04W 4/38* (2018.02)

(58) Field of Classification Search
CPC ........ G06N 99/005; G06N 20/00; G06N 3/08; G06N 3/084; G06N 3/04; G06N 3/0454; G06N 3/02; H04W 4/38; H04N 7/014; H04N 5/23258; G01S 7/417; G01S 13/04
USPC ..................................................... 706/12, 20
See application file for complete search history.

(56) References Cited

U.S. PATENT DOCUMENTS

| | | | |
|---|---|---|---|
| 4,054,879 A | 10/1977 | Wright et al. | |
| 4,649,388 A | 3/1987 | Atlas | |
| 4,740,045 A | 4/1988 | Goodson et al. | |
| 5,270,720 A | 12/1993 | Stove | |
| 5,696,514 A | 12/1997 | Nathanson et al. | |
| 6,075,797 A | 6/2000 | Thomas | |
| 6,573,861 B1 | 6/2003 | Hommel et al. | |
| 7,652,617 B2 | 1/2010 | Kurtz et al. | |
| 8,660,578 B1 | 2/2014 | Yang et al. | |
| 8,671,069 B2 * | 3/2014 | Chang | G06F 17/30817 706/45 |
| 9,030,321 B2 | 5/2015 | Breed | |
| 9,329,701 B2 * | 5/2016 | Lautner | G06F 3/0346 |
| 9,523,760 B1 | 12/2016 | Kravets et al. | |
| 9,524,628 B1 | 12/2016 | Omer et al. | |

(Continued)

FOREIGN PATENT DOCUMENTS

| | | |
|---|---|---|
| CA | 2834522 | 5/2014 |
| CA | 2945702 | 8/2015 |

(Continued)

OTHER PUBLICATIONS

Dekker , et al., "Gesture Recognition with a Low Power FMCW Radar and a Deep Convolutional Neural Network", Proceedings of the 14th European Radar Conference, Nuremberg, Germany, Oct. 11-13, 2017, 4 pgs.

(Continued)

*Primary Examiner* — Dave Misir
(74) *Attorney, Agent, or Firm* — Henry Patent Law Firm PLLC

(57) ABSTRACT

In a general aspect of the examples described, sensor data from a sensor device are used to improve training data for a motion detection system. In some aspects, "ground truth" labels, sensor data, and channel information are received for a motion detection training period. The labels and sensor data are analyzed to detect variances between the labels and sensor data. The labels are corrected or augmented based on the sensor data. The channel information is tagged with the labels and provided as training information to train the motion detection system.

21 Claims, 8 Drawing Sheets

(56) References Cited

U.S. PATENT DOCUMENTS

| | | |
|---|---|---|
| 9,584,974 B1 | 2/2017 | Omer et al. |
| 9,743,294 B1 | 8/2017 | Omer et al. |
| 9,927,519 B1 * | 3/2018 | Omer .................... G01S 5/0273 |
| 9,933,517 B1 | 4/2018 | Olekas et al. |
| 9,989,622 B1 | 6/2018 | Griesdorf et al. |
| 10,004,076 B1 | 6/2018 | Griesdorf et al. |
| 2003/0108119 A1 | 6/2003 | Mohebbi et al. |
| 2007/0296571 A1 | 12/2007 | Kolen |
| 2008/0119130 A1 | 5/2008 | Sinha |
| 2008/0240008 A1 | 10/2008 | Backes et al. |
| 2008/0303655 A1 | 12/2008 | Johnson |
| 2009/0062696 A1 | 3/2009 | Nathan et al. |
| 2010/0130229 A1 | 5/2010 | Sridhara et al. |
| 2010/0315284 A1 | 12/2010 | Trizna et al. |
| 2012/0115512 A1 | 5/2012 | Grainger et al. |
| 2012/0146788 A1 | 6/2012 | Wilson et al. |
| 2013/0113647 A1 | 5/2013 | Sentelle et al. |
| 2013/0162459 A1 | 6/2013 | Aharony et al. |
| 2013/0283256 A1 | 10/2013 | Proud |
| 2014/0135042 A1 | 5/2014 | Buchheim et al. |
| 2014/0247179 A1 | 9/2014 | Furuskog |
| 2014/0286380 A1 | 9/2014 | Prager et al. |
| 2015/0043377 A1 | 2/2015 | Cholas et al. |
| 2015/0063323 A1 | 3/2015 | Sadek et al. |
| 2015/0078295 A1 | 3/2015 | Mandyam et al. |
| 2015/0098377 A1 | 4/2015 | Amini et al. |
| 2015/0195100 A1 | 7/2015 | Imes et al. |
| 2015/0245164 A1 | 8/2015 | Merrill |
| 2015/0338507 A1 | 11/2015 | Oh et al. |
| 2016/0018508 A1 | 1/2016 | Chen et al. |
| 2016/0183059 A1 | 6/2016 | Nagy et al. |
| 2016/0187475 A1 | 6/2016 | Horng et al. |
| 2016/0210838 A1 | 7/2016 | Yan et al. |
| 2017/0042488 A1 | 2/2017 | Muhsin |
| 2017/0146656 A1 | 5/2017 | Belsley et al. |
| 2017/0278374 A1 | 9/2017 | Skaaksrud |
| 2017/0280351 A1 | 9/2017 | Skaaksrud |
| 2017/0311279 A1 | 10/2017 | Martinez et al. |
| 2017/0343658 A1 | 11/2017 | Ramirez et al. |
| 2018/0106885 A1 | 4/2018 | Blayvas |

FOREIGN PATENT DOCUMENTS

| | | |
|---|---|---|
| WO | 2014/021574 | 2/2014 |
| WO | 2014/201574 | 12/2014 |
| WO | 2015/168700 | 11/2015 |
| WO | 2016/066822 | 5/2016 |
| WO | 2016/110844 | 7/2016 |
| WO | 2017/106976 | 6/2017 |
| WO | 2017/132765 | 8/2017 |
| WO | 2017/210770 | 12/2017 |
| WO | 2018/094502 | 5/2018 |

OTHER PUBLICATIONS

Youssef, Moustafa , et al., "Challenges: Device-free Passive Localization for Wireless Environments", Mobicom 07 Proceedings of the 13th Annual ACM International Conference on Mobile Computing and Networking, Sep. 2007, 31 pgs.

WIPO, International Search Report and Written Opinion dated Feb. 5, 2019, in PCT/CA2018/051115, 7 pgs.

Domenico, et al., "Exploring Training Options for RF Sensing Using CSI", IEEE Communications Magazine, May 2018, vol. 56, Issue 5, pp. 116-123, 8 pgs.

Iqbal , et al., "Indoor Motion Classification Using Passive RF Sensing Incorporating Deep Learning", ISSN: 2577-2465, Electronic IEEE, Jun. 3, 2018, 5 pgs. Date precludes it as prior art.

* cited by examiner

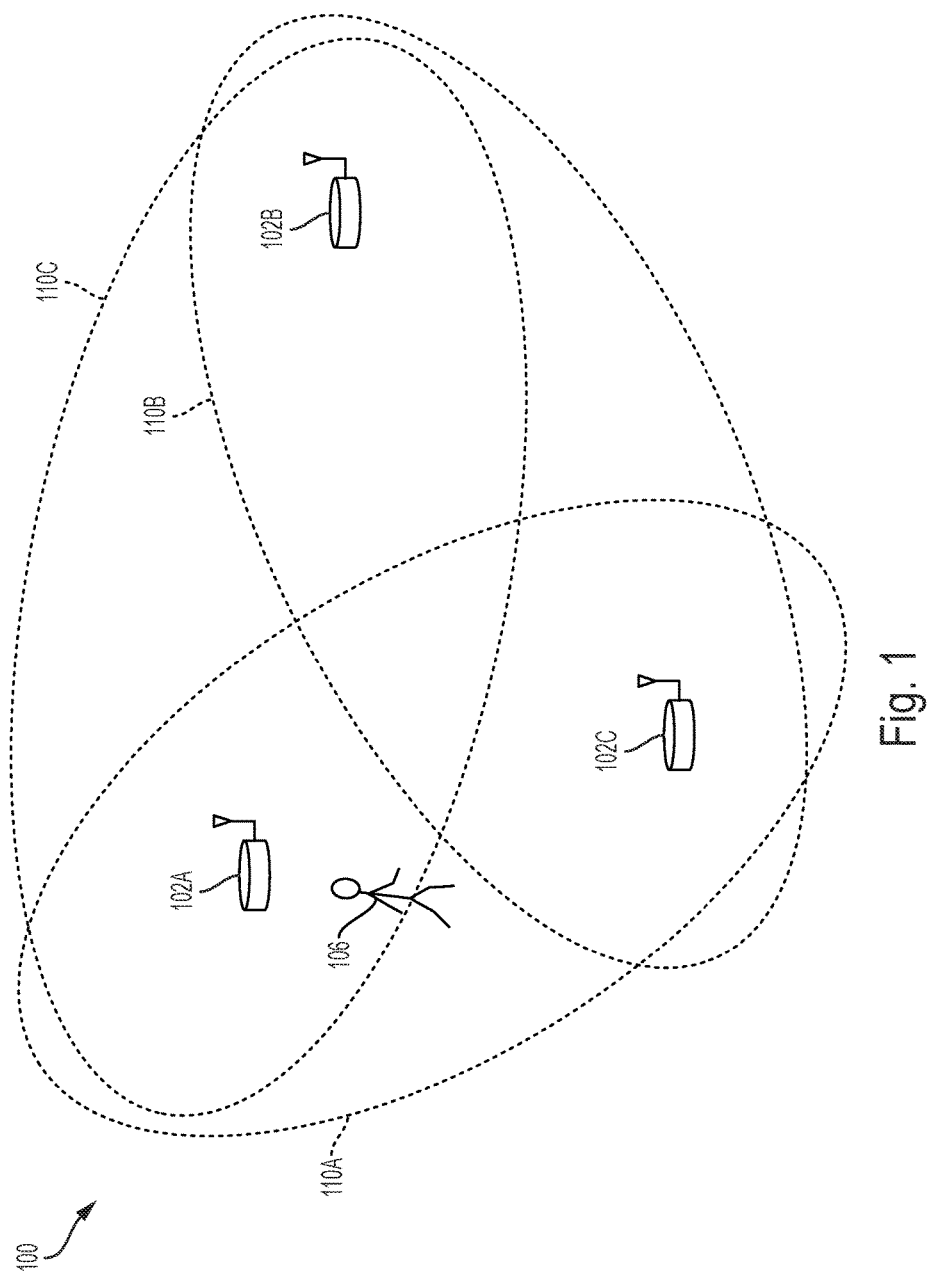

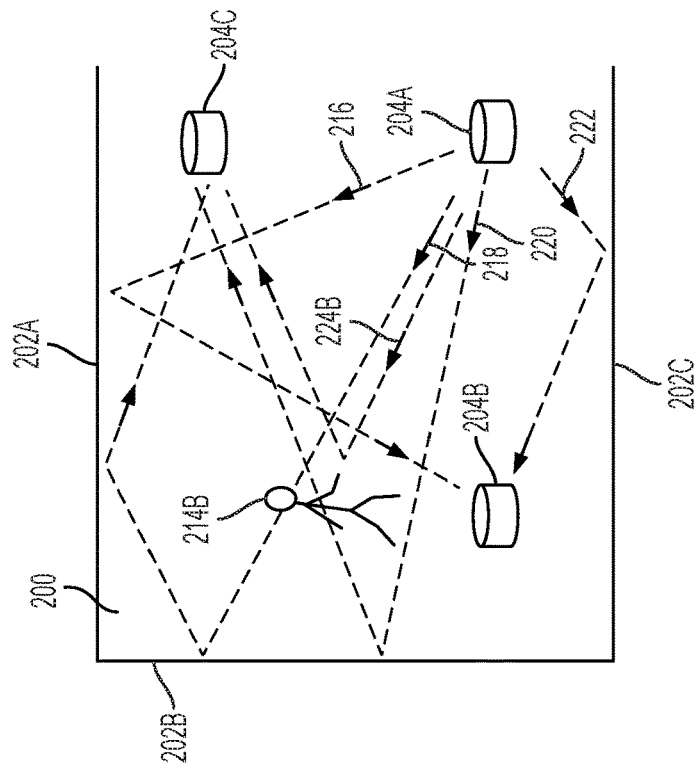
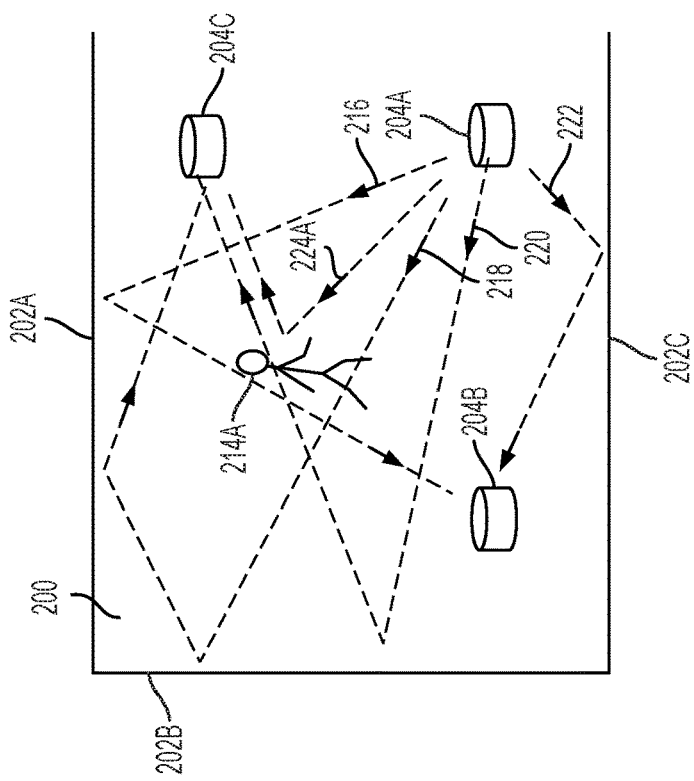

TRAINING DATA FOR A MOTION DETECTION SYSTEM USING DATA FROM A SENSOR DEVICE

BACKGROUND

The following description relates improving the accuracy of training data for a motion detection system using data from a sensor device.

Motion detection systems have been used to detect movement, for example, of objects in a room or an outdoor area. In some example motion detection systems, infrared or optical sensors are used to detect movement of objects in the sensor's field of view. Motion detection systems have been used in security systems, automated control systems and other types of systems.

DESCRIPTION OF DRAWINGS

FIG. 1 is a diagram showing an example wireless communication system.

FIGS. 2A and 2B are diagrams showing example wireless signals communicated between wireless communication devices.

DETAILED DESCRIPTION

Figure 3:
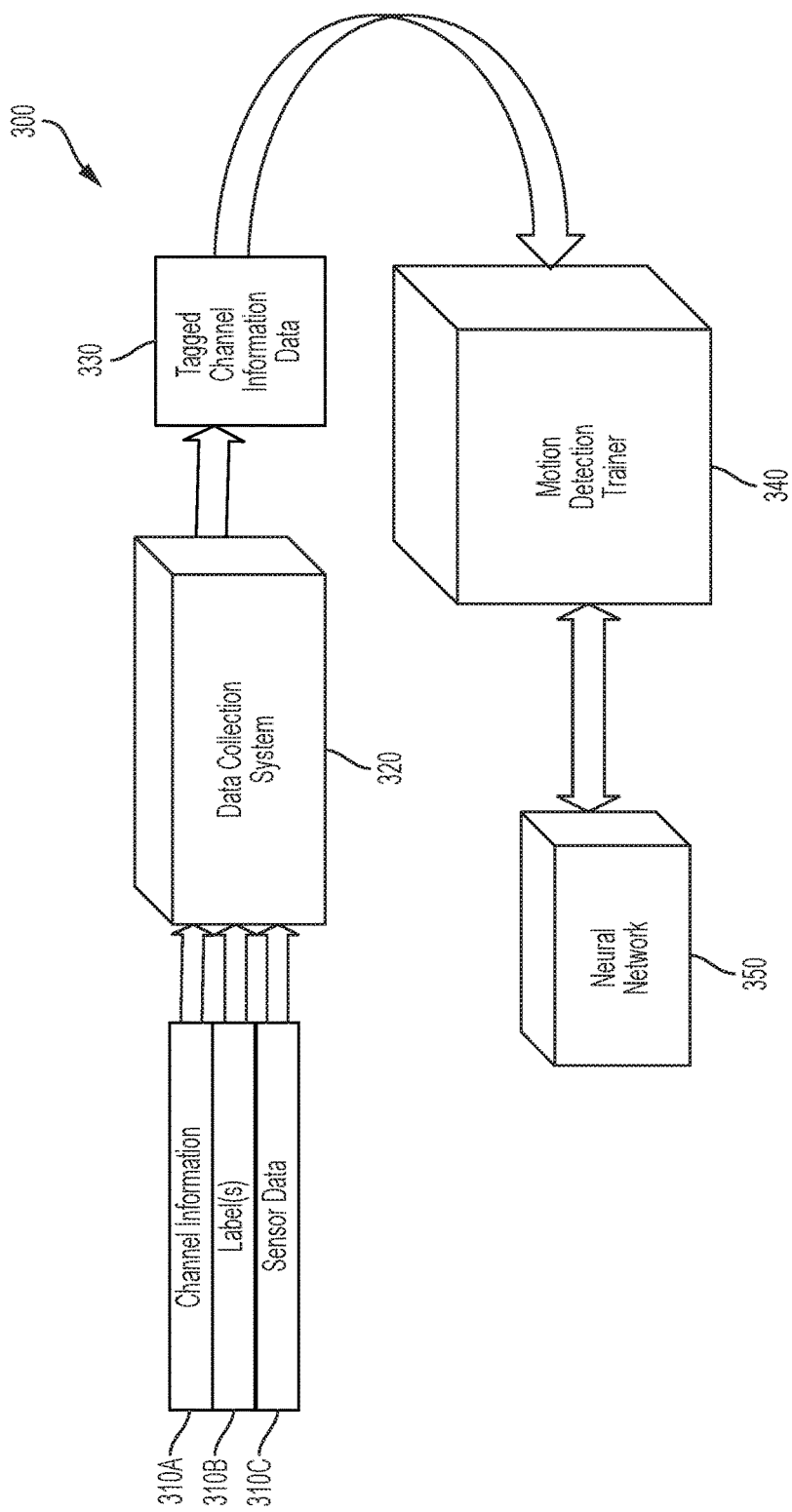
FIG. 3 is a block diagram showing an example motion detection training system.

In a general aspect, motion in a space can be detected using information from multiple wireless communication devices (e.g., of a wireless mesh network or another type of wireless network) communicating through the space. For instance, wireless signals received at one or more of the devices in a wireless communication network may be analyzed to determine channel information for the different communication links in the network (between respective pairs of devices in the network). In some instances, the channel information includes channel state information (also referred to herein as wireless channel state information). Channel state information may include channel properties of a communication link and may describe how a wireless signal propagates from a transmitter to a receiver, representing the combined effect of, for example, scattering, fading, and power decay within the space between the transmitter and receiver. In some instances, the channel information includes beamforming state information. Beamforming (or spatial filtering) may refer to a signal processing technique used in multi antenna (multiple-input/multiple-output (MIMO)) radio systems for directional signal transmission or reception. Beamforming can be achieved by combining elements in an antenna array in such a way that signals at particular angles experience constructive interference while others experience destructive interference. Beamforming can be used at both the transmitting and receiving ends in order to achieve spatial selectivity. In some cases (e.g., the IEEE 802.11ac standard), a beamforming steering matrix is used by a transmitter. The beamforming matrix may include a mathematical description of how the antenna array should use each of its individual antenna elements to select a spatial path for transmission. Although certain aspects may be described herein with respect to channel state information, beamforming state information or beamformer steering matrix state may be used in the aspects described as well.

The channel information for one or more communication links can be analyzed (e.g., by one of the wireless communication devices, by a hub device in the network, or a remote device communicably coupled to the network) to detect whether motion has occurred in the space, to determine a relative location of the detected motion, or both. In some implementations, the wireless communication network includes a wireless mesh network. A wireless mesh network may be deployed as a decentralized wireless network whose nodes (devices) communicate directly in a point-to-point manner without using a central access point, base station or network controller. Wireless mesh networks may include mesh clients, mesh routers, or mesh gateways. In some instances, a wireless mesh network is based on the IEEE 802.11s standard. In some instances, a wireless mesh network is based on WI-FI ad hoc or another proprietary technology.

In some implementations, channel information for one or more pairs of devices in a communication system is obtained at a first time point, and at subsequent time points thereafter, e.g., in a temporal sequence. Motion may be detected by analyzing the channel information of the one or more links of the communication system over time. In some implementations, the channel information for the respective communication links may be analyzed by a neural network to detect motion or determine a location of detected motion.

In an example, while in training mode, a motion detection system may associate motion of an object within a distinct region within a space, with channel information obtained while motion of the object occurred within the distinct region. In an example, a neural network may be trained by gathering channel information from the devices of the wireless network based on transmitted training signals as a user walks through the space. In some cases, the channel information may be tagged with motion information based on whether the user is currently moving, according to a location of the user, or in another manner. The tagged channel information may be analyzed by the neural network and used in training the neural network to detect motion of an object, a category of motion (e.g., motion by a human vs. a pet), or a location of detected motion.

In some aspects, during motion detection training, channel information data based on training signals is received. In some cases, the training signals include wireless signals transmitted by a wireless communication device through a space during a motion detection training time period. In some cases, one or more labels based on information input to a user interface of a mobile device during the motion detection training time period is received, and sensor data collected by a sensor device in the space during the motion detection training time period is also received. The one or more labels and the sensor data are analyzed to detect any variance between the labels and the sensor data. A tag is generated based on the analysis of the label and the sensor data. The channel information and the tag are provided as training input to train the motion detection system (e.g., to train the neural network).

In some cases, processes that use wireless channel information for motion detection and motion source localization may identify specific signatures associated with a certain motion states, e.g., "motion" or "no motion" states. These signatures may be identified by analyzing a temporal (e.g., time) sequence of signals that include or are generated based on the wireless channel information. This can be performed, for example, by using supervised or unsupervised machine learning to train a classifier system based on measured datasets. For instance, signatures can be identified during training of a motion detection system, using either supervised or unsupervised machine learning methods, when measured training sets are being identified and classified. A measured training dataset may be comprised of channel information, e.g., a set of channel responses, and tagged information associated with the channel information. In one aspect, the classifier may identify a measured training dataset and associate the dataset with a type of motion (e.g., "motion" or "no motion") or a category of motion (human or animal, etc.).

In the case of supervised machine learning, individual motion detection systems are trained after each system is installed and may also be trained at other times during normal system operation. For example, a motion detection system may be trained during system operation in order to adjust system performance or to identify new features of detected motion types, for example, to identify new zones, locations, or gestures. The supervised machine learning training process includes input from a user during the training period. For example, a user data labels during the training period while the motion detection system is measuring and recording wireless channel state information. These data labels may be considered "ground truth" data labels and may become part of the training dataset. Information provided by a user or based on user input may be considered "ground truth," for instance, representing information about the motion that is known from another source. In some instances, during supervised training, a user may perform a "walkthrough" in which the user may walk or perform certain gestures while inside a zone of interest. At the same time, the user may provide additional "ground truth" motion data information, such as, time, motion type, and motion zone labels associated with the walkthrough, to the motion detection system. The user may input the data labels into a motion detection training application on a mobile device (e.g., a smartphone, a smart watch, a tablet, etc.) carried by the user. The mobile device may then provide the data labels to the motion detection training system to be associated with corresponding channel information. These data labels may then become part of the measured dataset.

In some implementations, a supervised training process of a motion detection system collects motion data from one or more built-in sensors of a mobile device or other wearable device worn or carried by the user during the training process. In some instances, real-time motion information may be collected by the sensors and used to augment or correct user input, e.g., "ground truth" data labels, provided by the user during the supervised training process. The built-in sensor of the mobile device or other wearable device may include an accelerometer, gyroscope, compass, pedometer, barometer, or any other type of sensor capable of providing information related to motion, including a combination of sensors. Sensors may provide the same or similar kinds of motion information as the user, such as, time, motion data or type, and location, in addition to information collected by the sensor but not provided or available to the user, including direction, speed, number of steps, etc. The motion detection training system may combine the motion information provided by the sensors with the motion data labels input by the user to the application on the mobile device to create data label reports. The data label reports may be sent to the cloud or to a motion sensor of the motion detection system for further augmentation of the recorded wireless channel state with known "ground truth" labels.

In an example, during supervised training, a user may provide motion state information indicating that the user was moving at a certain time, but one or more sensors positively identify motion only after a few seconds later. In this instance, the timestamp of the provided "ground truth" label will be adjusted according to the sensors' time measurement. In another example, a user may be instructed to stand still while the system trains for a "no motion" state, but mobile sensors report data detecting motion. The sensor may report this information. In this case, all collected data for this training event, including channel information, user input, and sensor data, can be discarded as the information will be inaccurate as representing a "no motion" motion state.

Aspects of the systems and techniques described here may provide one or more technical advantages in some instances. For example, true motion data may be captured, e.g., with "ground truth" labels, that indicates the actual motion state that occurred, thus improving accuracy of motion detection and motion source location. In some instances, the additional sensor data provided during supervised machine learning may improve identification, by the motion detection system, of new features associated with certain temporal signatures of the wireless channel. Errors associated with a process of manual training and manual motion labeling by a user can be reduced or eliminated in some cases. For example, certain types of user input errors during the training process (e.g., labels may be missed, labels may be entered at the wrong time, or labels may contain wrong information) and the resulting misalignment of dataset labels with the channel state information may cause the machine learning to learn the "wrong thing" or to learn convergence and inference with poor quality and consequently, to make poor generalizations to similar motions in the same environment, and the systems and techniques described here may be used to improve accuracy by reducing or eliminating these and potentially other types of errors.

FIG. 1 illustrates an example wireless communication system 100. The example wireless communication system 100 includes three wireless communication devices—a first wireless communication device 102A, a second wireless communication device 102B, and a third wireless communication device 102C. The example wireless communication system 100 may include additional wireless communication devices and other components (e.g., additional wireless communication devices, one or more network servers, network routers, network switches, cables, or other communication links, etc.).

The example wireless communication devices 102A, 102B, 102C can operate in a wireless network, for example, according to a wireless network standard or another type of wireless communication protocol. For example, the wireless network may be configured to operate as a Wireless Local Area Network (WLAN), a Personal Area Network (PAN), a metropolitan area network (MAN), a mesh network, or another type of wireless network. Examples of WLANs include networks configured to operate according to one or more of the 802.11 family of standards developed by IEEE (e.g., Wi-Fi networks), and others. Examples of PANs include networks that operate according to short-range communication standards (e.g., BLUETOOTH®, Near Field Communication (NFC), ZigBee), millimeter wave communications, and others.

In some implementations, the wireless communication devices 102A, 102B, 102C may be configured to communicate in a cellular network, for example, according to a cellular network standard. Examples of cellular networks include networks configured according to 2G standards such as Global System for Mobile (GSM) and Enhanced Data rates for GSM Evolution (EDGE) or EGPRS; 3G standards such as Code Division Multiple Access (CDMA), Wideband Code Division Multiple Access (WCDMA), Universal Mobile Telecommunications System (UMTS), and Time Division Synchronous Code Division Multiple Access (TD-SCDMA); 4G standards such as Long-Term Evolution (LTE) and LTE-Advanced (LTE-A); and others.

In the example shown in FIG. 1, the wireless communication devices 102A, 102B, 102C can be, or they may include, standard wireless network components. For example, the wireless communication devices 102A, 102B, 102C may be commercially-available Wi-Fi access points or another type of wireless access point (WAP) performing one or more operations as described herein that are embedded as instructions (e.g., software or firmware) on the modem of the WAP. In some cases, the wireless communication devices 102A, 102B, 102C may be nodes of a wireless mesh network, such as, for example, a commercially-available mesh network system (e.g., GOOGLE WIFI). In some cases, another type of standard or conventional Wi-Fi transmitter device may be used. The wireless communication devices 102A, 102B, 102C may be implemented without Wi-Fi components; for example, other types of standard or non-standard wireless communication may be used for motion detection. In some cases, the wireless communication devices 102A, 102B, 102C can be, or they may be part of, a dedicated motion detection system. For example, the dedicated motion detection system can include a hub device and one or more beacon devices (as remote sensor devices), and the wireless communication devices 102A, 102B, 102C can be either a hub device or a beacon device in the motion detection system.

In the example shown in FIG. 1, the wireless communication devices 102A, 102B transmit wireless signals (e.g., according to a wireless network standard, a motion detection protocol, or otherwise). For instance, wireless communication devices 102A, 102B may broadcast wireless motion probe signals (e.g., as described above), or they may send wireless signals addressed to other devices (e.g., a user equipment, a client device, a server, etc.), and the other devices (not shown) as well as the wireless communication device 102C may receive the wireless signals transmitted by the wireless communication devices 102A, 102B. In some cases, the wireless signals transmitted by the wireless communication devices 102A, 102B are repeated periodically, for example, according to a wireless communication standard or otherwise.

In the example shown, the wireless communication device 102C processes the wireless signals from the wireless communication devices 102A, 102B to detect motion of an object in a space accessed by the wireless signals, to determine a location of the detected motion, or both. For example, the wireless communication device 102C may perform one or more operations of the example processes described below with respect to FIGS. 2A-2B, or another type of process for detecting motion or determining a location of detected motion. The space accessed by the wireless signals can be an indoor or outdoor space, which may include, for example, one or more fully or partially enclosed areas, an open area without enclosure, etc. The space can be or can include an interior of a room, multiple rooms, a building, or the like. In some cases, the wireless communication system 100 can be modified, for instance, such that the wireless communication device 102C can transmit wireless signals and the wireless communication devices 102A, 102B can processes the wireless signals from the wireless communication device 102C to detect motion or determine a location of detected motion. In this example, a communication device 102C transmitting wireless signals may be operate as a source device, communication devices 102A, 102B that receive and process wireless signals may operate as sensor devices.

The wireless signals used for motion detection can include, for example, a beacon signal (e.g., Bluetooth Beacons, Wi-Fi Beacons, other wireless beacon signals), pilot signals (e.g., pilot signals used for channel sounding, such as in beamforming applications), or another standard signal generated for other purposes according to a wireless network standard, or non-standard signals (e.g., random signals, reference signals, etc.) generated for motion detection or other purposes. In some examples, the wireless signals propagate through an object (e.g., a wall) before or after interacting with a moving object, which may allow the moving object's movement to be detected without an optical line-of-sight between the moving object and the transmission or receiving hardware. Based on the received signals, the third wireless communication device 102C may generate motion detection data. In some instances, the third wireless communication device 102C may communicate the motion detection data to another device or system, such as a security system, that may include a control center for monitoring movement within a space, such as a room, building, outdoor area, etc.

In some implementations, the wireless communication devices 102A, 102B can be modified to transmit motion probe signals (e.g., as described above) on a separate wireless communication channel (e.g., a frequency channel or coded channel) from wireless network traffic signals. For example, the modulation applied to the payload of a motion probe signal and the type of data or data structure in the payload may be known by the third wireless communication device 102C, which may reduce the amount of processing that the third wireless communication device 102C performs for motion sensing. The header may include additional information such as, for example, an indication of whether motion was detected by another device in the communication system 100, an indication of the modulation type, an identification of the device transmitting the signal, etc.

In the example shown in FIG. 1, the wireless communication system 100 includes wireless communication links between each of the respective wireless communication devices 102. In the example shown, the wireless communication link between the third wireless communication device 102C and the first wireless communication device 102A can be used to probe a first motion detection field 110A, the wireless communication link between the third wireless communication device 102C and the second wireless communication device 102B can be used to probe a second motion detection field 110B, and the wireless communication link between the first wireless communication device 102A and the second wireless communication device 102B can be used to probe a third motion detection field 110C. In some instances, each wireless communication device 102 detects motion in the motion detection fields 110 accessed by that device by processing received signals that are based on wireless signals transmitted by the wireless communication devices 102 through the motion detection fields 110. For example, when the person 106 shown in FIG. 1 moves in the first motion detection field 110A and the third motion detection field 110C, the wireless communication devices 102 may detect the motion based on signals they received that are based on wireless signals transmitted through the respective motion detection fields 110. For instance, the first wireless communication device 102A can detect motion of the person in both motion detection fields 110A, 110C, the second wireless communication device 102B can detect motion of the person 106 in the motion detection field 110C, and the third wireless communication device 102C can detect motion of the person 106 in the motion detection field 110A.

In some instances, the motion detection fields 110 can include, for example, air, solid materials, liquids, or another medium through which wireless electromagnetic signals may propagate. In the example shown in FIG. 1, the first motion detection field 110A provides a wireless communication channel between the first wireless communication device 102A and the third wireless communication device 102C, the second motion detection field 110B provides a wireless communication channel between the second wireless communication device 102B and the third wireless communication device 102C, and the third motion detection field 110C provides a wireless communication channel between the first wireless communication device 102A and the second wireless communication device 102B. In some aspects of operation, wireless signals transmitted on a wireless communication channel (separate from or shared with the wireless communication channel for network traffic) are used to detect movement of an object in a space. The objects can be any type of static or moveable object, and can be living or inanimate. For example, the object can be a human (e.g., the person 106 shown in FIG. 1), an animal, an inorganic object, or another device, apparatus, or assembly), an object that defines all or part of the boundary of a space (e.g., a wall, door, window, etc.), or another type of object. In some implementations, motion information from the wireless communication devices may be analyzed to determine a location of the detected motion. For example, as described further below, one of the wireless communication devices 102 (or another device communicably coupled to the devices 102) may determine that the detected motion is nearby a particular wireless communication device.

FIGS. 2A and 2B are diagrams showing example wireless signals communicated between wireless communication devices 204A, 204B, 204C. The wireless communication devices 204A, 204B, 204C can be, for example, the wireless communication devices 102A, 102B, 102C shown in FIG. 1, or other types of wireless communication devices. The example wireless communication devices 204A, 204B, 204C transmit wireless signals through a space 200. The example space 200 can be completely or partially enclosed or open at one or more boundaries of the space 200. The space 200 can be or can include an interior of a room, multiple rooms, a building, an indoor area, outdoor area, or the like. A first wall 202A, a second wall 202B, and a third wall 202C at least partially enclose the space 200 in the example shown.

In the example shown in FIGS. 2A and 2B, the first wireless communication device 204A is operable to transmit wireless motion probe signals repeatedly (e.g., periodically, intermittently, at scheduled, unscheduled or random intervals, etc.). The second and third wireless communication devices 204B, 204C are operable to receive signals based on the motion probe signals transmitted by the wireless communication device 204A. The motion probe signals may be formatted as described above. For example, in some implementations, the motion probe signals include standard signaling or communication frames that include standard pilot signals used in channel sounding (e.g., channel sounding for beamforming according to the IEEE 802.11ac-2013 standard). The wireless communication devices 204B, 204C each have a modem, processor, or other component that is configured to process received motion detection signals to detect motion of an object in the space 200.

As shown, an object is in a first position 214A in FIG. 2A, and the object has moved to a second position 214B in FIG. 2B. In FIGS. 2A and 2B, the moving object in the space 200 is represented as a human, but the moving object can be another type of object. For example, the moving object can be an animal, an inorganic object (e.g., a system, device, apparatus, or assembly), an object that defines all or part of the boundary of the space 200 (e.g., a wall, door, window, etc.), or another type of object.

As shown in FIGS. 2A and 2B, multiple example paths of the wireless signals transmitted from the first wireless communication device 204A are illustrated by dashed lines. Along a first signal path 216, the wireless signal is transmitted from the first wireless communication device 204A and reflected off the first wall 202A toward the second wireless communication device 204B. Along a second signal path 218, the wireless signal is transmitted from the first wireless communication device 204A and reflected off the second wall 202B and the first wall 202A toward the third wireless communication device 204C. Along a third signal path 220, the wireless signal is transmitted from the first wireless communication device 204A and reflected off the second wall 202B toward the third wireless communication device 204C. Along a fourth signal path 222, the wireless signal is transmitted from the first wireless communication device 204A and reflected off the third wall 202C toward the second wireless communication device 204B.

In FIG. 2A, along a fifth signal path 224A, the wireless signal is transmitted from the first wireless communication device 204A and reflected off the object at the first position 214A toward the third wireless communication device 204C. Between FIGS. 2A and 2B, a surface of the object moves from the first position 214A to a second position 214B in the space 200 (e.g., some distance away from the first position 214A). In FIG. 2B, along a sixth signal path 224B, the wireless signal is transmitted from the first wireless communication device 204A and reflected off the object at the second position 214B toward the third wireless communication device 204C. The sixth signal path 224B depicted in FIG. 2B is longer than the fifth signal path 224A depicted in FIG. 2A due to the movement of the object from the first position 214A to the second position 214B. In some examples, a signal path can be added, removed, or otherwise modified due to movement of an object in a space.

The example wireless signals shown in FIGS. 2A and 2B may experience attenuation, frequency shifts, phase shifts, or other effects through their respective paths and may have portions that propagate in another direction, for example, through the walls 202A, 202B, and 202C. In some examples, the wireless signals are radio frequency (RF) signals. The wireless signals may include other types of signals.

In the example shown in FIGS. 2A and 2B, the first wireless communication device 204A can repeatedly transmit a wireless signal. In particular, FIG. 2A shows the wireless signal being transmitted from the first wireless communication device 204A at a first time, and FIG. 2B shows the same wireless signal being transmitted from the first wireless communication device 204A at a second, later time. The transmitted signal can be transmitted continuously, periodically, at random or intermittent times or the like, or a combination thereof. The transmitted signal can have a number of frequency components in a frequency bandwidth. The transmitted signal can be transmitted from the first wireless communication device 204A in an omnidirectional manner, in a directional manner or otherwise. In the example shown, the wireless signals traverse multiple respective paths in the space 200, and the signal along each path may become attenuated due to path losses, scattering, reflection, or the like and may have a phase or frequency offset.

As shown in FIGS. 2A and 2B, the signals from various paths 216, 218, 220, 222, 224A, and 224B combine at the third wireless communication device 204C and the second wireless communication device 204B to form received signals. Because of the effects of the multiple paths in the space 200 on the transmitted signal, the space 200 may be represented as a transfer function (e.g., a filter) in which the transmitted signal is input and the received signal is output. When an object moves in the space 200, the attenuation or phase offset affected upon a signal in a signal path can change, and hence, the transfer function of the space 200 can change. Assuming the same wireless signal is transmitted from the first wireless communication device 204A, if the transfer function of the space 200 changes, the output of that transfer function—the received signal—will also change. A change in the received signal can be used to detect movement of an object.

Mathematically, a transmitted signal f (t) transmitted from the first wireless communication device 204A may be described according to Equation (1):

$$f(t) = \sum_{n=-\infty}^{\infty} c_n e^{j\omega_n t} \quad (1)$$

where $\omega_n$ represents the frequency of $n^{th}$ frequency component of the transmitted signal, $c_n$ represents the complex coefficient of the $n^{th}$ frequency component, and t represents time. With the transmitted signal f(t) being transmitted from the first wireless communication device 204A, an output signal $r_k$(t) from a path k may be described according to Equation (2):

$$r_k(t) = \sum_{n=-\infty}^{\infty} \alpha_{n,k} c_n e^{j(\omega_n t + \phi_{n,k})} \quad (2)$$

where $\alpha_{n,k}$ represents an attenuation factor (or channel response; e.g., due to scattering, reflection, and path losses) for the $n^{th}$ frequency component along path k, and $\phi_{n,k}$ represents the phase of the signal for $n^{th}$ frequency component along path k. Then, the received signal R at a wireless communication device can be described as the summation of all output signals $r_k$(t) from all paths to the wireless communication device, which is shown in Equation (3):

$$R = \sum_k r_k(t) \quad (3)$$

Substituting Equation (2) into Equation (3) renders the following Equation (4):

$$R = \sum_k \sum_{n=-\infty}^{\infty} (\alpha_{n,k} e^{j\phi_{n,k}}) c_n e^{j\omega_n t} \quad (4)$$

The received signal R at a wireless communication device can then be analyzed. The received signal R at a wireless communication device can be transformed to the frequency domain, for example, using a Fast Fourier Transform (FFT) or another type of algorithm. The transformed signal can represent the received signal R as a series of n complex values, one for each of the respective frequency components (at the n frequencies $\omega_n$). For the frequency of an nth frequency component of the transmitted signal $\omega_n$, a complex value $Y_n$ may be represented as follows in Equation (5):

$$Y_n = \sum_k c_n \alpha_{n,k} e^{j\phi_{n,k}}. \quad (5)$$

The complex value $Y_n$ for a given frequency component $\omega_n$ indicates a relative magnitude and phase offset of the received signal at that frequency component $\omega_n$. When an object moves in the space, the complex value $Y_n$ changes due to the channel response $\alpha_{n,k}$ of the space changing. Accordingly, a change detected in the channel response (and thus, the complex value $Y_n$) can be indicative of movement of an object within the communication channel. Thus, in some implementations, the complex value $Y_n$ for each of multiple devices in a wireless mesh network can be analyzed to detect whether motion has occurred in a space traversed by the transmitted signals f (t).

FIG. 3 is a diagram showing an example motion detection training system 300. The example motion detection training system 300 includes data collection system 320, motion detection trainer 340, and neural network 350. In some instances, the motion detection training system 300 is configured to be used during supervised training. For example, as described above, for a supervised training period during which a user is motioning or gesturing through the space, or in some cases, being stationary in the space, the motion detection training system 300 may gather or receive as input channel information 310A from any of the devices 102A, 102B, 102C of the network, as described in FIGS. 2A and 2B. The motion detection training system 300 may also gather or receive as input data labels 310B generated based on user input during the supervised training period, which includes motion state information, such as, time, motion type, and motion zone (or location) labels. The data labels 310B may be provided to the motion detection training system either at the time they are input by the user or at a subsequent time such that labels 310B may be received together with, or separately from, the associated wireless channel information 310A. The motion detection training system 300 may correlate the data labels 310B to the wireless channel information 310A based on, e.g., timestamp or other information. The motion detection training system 300 may also gather or receive as input sensor data 310C which is collected during the supervised training period. In some instances, the sensor data 3100 may be provided to the motion detection training system 300 at the time it is collected or at a subsequent time such that sensor data 310C may be received together with or separate from the associated wireless channel information 310A and/or the data labels 310B. In some instances, the channel information, labels, and sensor data may be provided as a measured training dataset. In some cases, the sensor data 310C may be used to augment or correct the labels 310B provided by the user during the supervised training process. In some implementations, channel information 310A, labels 310B, and sensor data 310C are gathered by or provided to data collection system 320 of the motion detection training system 300. In some instances, data collection system 320 analyzes the training data (channel information 310A, labels 310B, sensor data 310C) and generates tagged channel information data 330. For example, channel information 310A may be tagged, or marked, with the corresponding data labels 310B provided by a user during supervised training to create tagged channel information data 330. In some cases, the data collection system 320 may use the sensor data 310C to correct or augment the data labels 310B that may have been input incorrectly by a user. After correcting or augmenting the "ground truth" data labels, the data collection system 320 may tag the channel information with corrected labels or augmented data to generate tagged channel information data 330. Data collection system 320 provides the tagged channel information data 330 to the motion detection trainer 340. Since the tagged channel information data 330 may provide a more accurate indication of motion when additional sensor data 310C is taken into account, the motion detection trainer 340 has more reliable information for which to train the neural network 350 for detecting motion types within a space.

In some cases, the motion detection trainer 340 and the neural network 350 represent a machine learning system (e.g., the GOOGLE CLOUD ML platform or another type of existing machine learning system). For example, the tagged channel information data 330 may be passed through a neural network to learn distinct patterns based on the channel information and tags (and potentially other information) provided by the data collection system 320. A machine learning system may include additional or different components, and may operate in another manner.

In some implementations, the neural network 350 includes a convolutional neural network or another type of neural network that includes multiple nodes organized in multiple layers. For example, the neural network 350 may include multiple convolutional layers, a max-pooling layer after at least one of the convolutional layers, a flattening layer after the max-pooling layer, and multiple dense (fully-connected) layers after the flattening layer.

In the example shown in FIG. 3, the motion detection trainer 340 processes the sets of tagged channel information data 330 to parameterize nodes of the neural network 350 (e.g., so that the neural network 350 can be used to detect motion based on untagged neural network input data). In some cases, for example, the motion detection trainer 340 may determine weights and a bias for each node of a neural network according to a cost function minimization operation, and each node in a layer may weight and bias its inputs according to the determined weights. For instance, a node may provide an output according to $$\alpha_{i+1} = b + \sum_j w_{i,j} a_{i,j} \quad (14)$$

where $a_{i+1}$ refers to the output of the node, b refers to the bias the node provides, $w_{i,j}$ refers to the weight applied to an output from a node of a previous layer $a_{i,j}$. The cost functions to be minimized may include:

$$C = -\frac{1}{n} \sum_i \sum_j [y_{j(i)} * \ln(a^L_{j(i)}) + (1 - y_{j(i)}) * \ln(1 - a^L_{j(i)})]. \quad (15.a)$$

$$C = -\frac{1}{n} \sum_i \sum_j \left[ x^i \left( 1\{y_{j(i)} = a^L_{j(i)}\} - \frac{e^{a^L_{j(i)}}}{\sum_j e^{a^L_{j(i)}}} \right) \right]. \quad (15.b)$$

where $x^i$ is the $i^{th}$ tagged input to neuron j of layer L. Equation (15.a) is the cost function for sigmoid activation and Equation (15.b) is the cost function for soft-max activation. In equation (15.b) the curly brackets define the binary result of whether the output of the node matches the theoretical output, with a matching result providing an output of one (1), otherwise zero (0).

The cost function C may be minimized using a gradient of decent methodology. For instance, the gradients of decent may be $$\frac{\partial C}{\partial w_j} = \frac{1}{n} \sum_x x_j(\sigma(z) - y) \quad (16)$$

and $$\frac{\partial C}{\partial b} = \frac{1}{n} \sum_x (\sigma(z) - y) \quad (17)$$

where σ(z) represents the Sigmoid function or Rectified Linear Unit (ReLU)

$$S(x) = \frac{e^x}{e^x + 1}. \quad (18.a)$$

$$\text{ReLU}(x) = \max(0, x). \quad (18.b)$$

In some instances, the weights may be initialized to have a normal distribution after iterations of gradient of decent-based training. In some implementations, the tagged input data can be processed by the motion detection trainer 340 to determine output values based on a current set of weights. A tag associated with input data can then be used with the output values to back propagate error and compute the gradient of decent according to the above equations.

After the neural network 350 has been trained with the tagged channel information data 330, newly collected data (e.g., newly collected or "untagged" channel information based on signals communicated by wireless communication devices) may be input to the neural network 350 to detect whether motion has occurred in the space. For instance, the trained neural network 350 may be used in a computer-implemented motion detection system to detect motion and properties of motion based on channel information (e.g., without the use of sensor data or labels based on user input). The neural network 350 may be re-trained or otherwise modified during or after use in the motion detection system. For instance, the motion detection system may obtain additional samples of tagged channel information data 330 in order to maintain or improve the performance of the neural network 350. In some cases, a motion detection system can detect motion using another type of trained system, e.g., a computer-implemented process other than the example neural network 350 shown in FIG. 3.

Figure 4B:
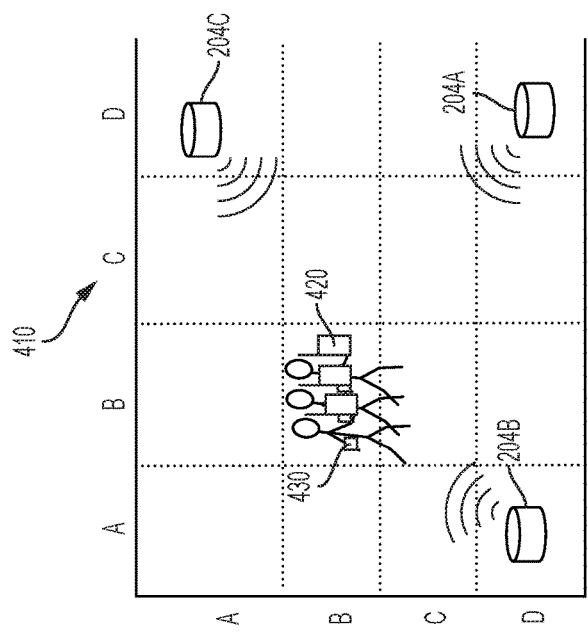
FIGS. 4A-4B are diagrams showing example collection of motion detection training information in a wireless communication system.
Figure 4A:
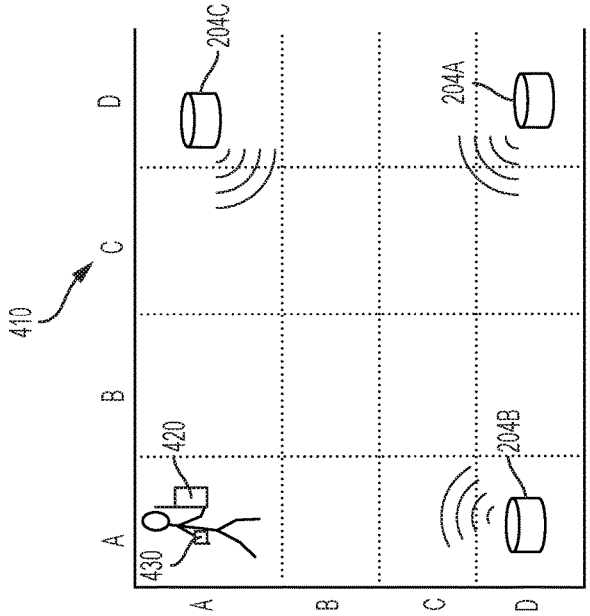

FIGS. 4A-4B are diagrams showing example collection of motion detection training information from a user and a sensor device in a motion detection system. For instance, the example in FIG. 4A illustrates a user with a mobile device 420 and a sensor device 430 during supervised training of a motion detection system for a space 410. The mobile device 420 may be any type of user equipment, mobile station, mobile phone, smart phone, smart watch, cell phone, tablet, laptop, VOIP phone or handset, or any other mobile device which is able to wirelessly send and receive data and/or signals to and from a network node in a wireless communications network and which includes a display or other component for providing user input to a motion detection training application. The sensor device 430 may be included in a wearable device worn on the user's wrist or may be any other type of wearable sensor device 430 and may be worn in any fashion and on any other part of the user's body. The sensor device may be or include, for example, an accelerometer, a gyroscope, a compass, a pedometer, a barometer, or any other type of sensor device that collects data association with motion or movement of a user. In some instances, the sensor device may be included in mobile device 420 utilized by the user during supervised training.

As shown in FIG. 4A, the space 410 is divided into separate regions to illustrate a location of the user. In this example, the user's position in the space 410 is in the region denoted A-A, and in FIG. 4B, the user's position in the space 410 is in the region denoted B-B. Wireless communication devices 204A, 204B, 204C are positioned about the space to transmit wireless communication signals through the space and to measure channel information, as described in FIGS. 2A and 2B. The channel information measurements may correspond in time to the collection of user input and sensor data to be further analyzed as described in FIG. 3, based on the supervised training time period. In one instance, the user may provide input (e.g., into an application on the mobile device 430) that is used to generate data labels, e.g., labels 310B, that corresponds with, and may describe, the user's movements. For example, the user may be instructed to provide "motion" information associated with the user's moving or gesturing in the space 410. In that case, the user may indicate through the user interface of mobile device 430 an indication of a time when the user began moving, an indication of the user's motion status (e.g., moving), an indication of the location of the user in space 410 (e.g., zone B-B), or any other information relevant to motion detection. In some instances, the location may be formatted GPS coordinates, a room location (e.g., kitchen, living room), or other indication of the user's location that is identifiable by motion detection training system 300. In another example, at another point in the same supervised training period, the user may be instructed to collect "no motion" information associated with the user being stationary. In that case, the user may provide similar information, such as, an indication of a time when the user began the motion (or lack of motion), an indication of the user's movement or gesture (e.g., stationary), an indication of the user's location in space 410 (e.g., A-A), etc. At the same time as the user is performing movements or gestures, the sensor device 430 may also collect motion information based on the user's movement. In some cases, the sensor device 430 may provide additional information, e.g., sensor data 310C not provided by the user in the data labels 310B, such as, direction of motion, number of steps taken by the user, etc. In some instances, there is a variance (e.g., a conflict) between the information, e.g., labels 310B, that is based on user input to the mobile device 420 and the data, e.g., sensor data 310C, collected by the sensor device 430. The data labels 310B, and sensor data 310C are provided to the motion detection training system 300 in FIG. 3 to be analyzed along with the channel information 310A, which was collected as described in FIGS. 2A and 2B, to detect variances, correct or augment the "ground truth" labels, and generate tagged channel information data.

Figure 5:
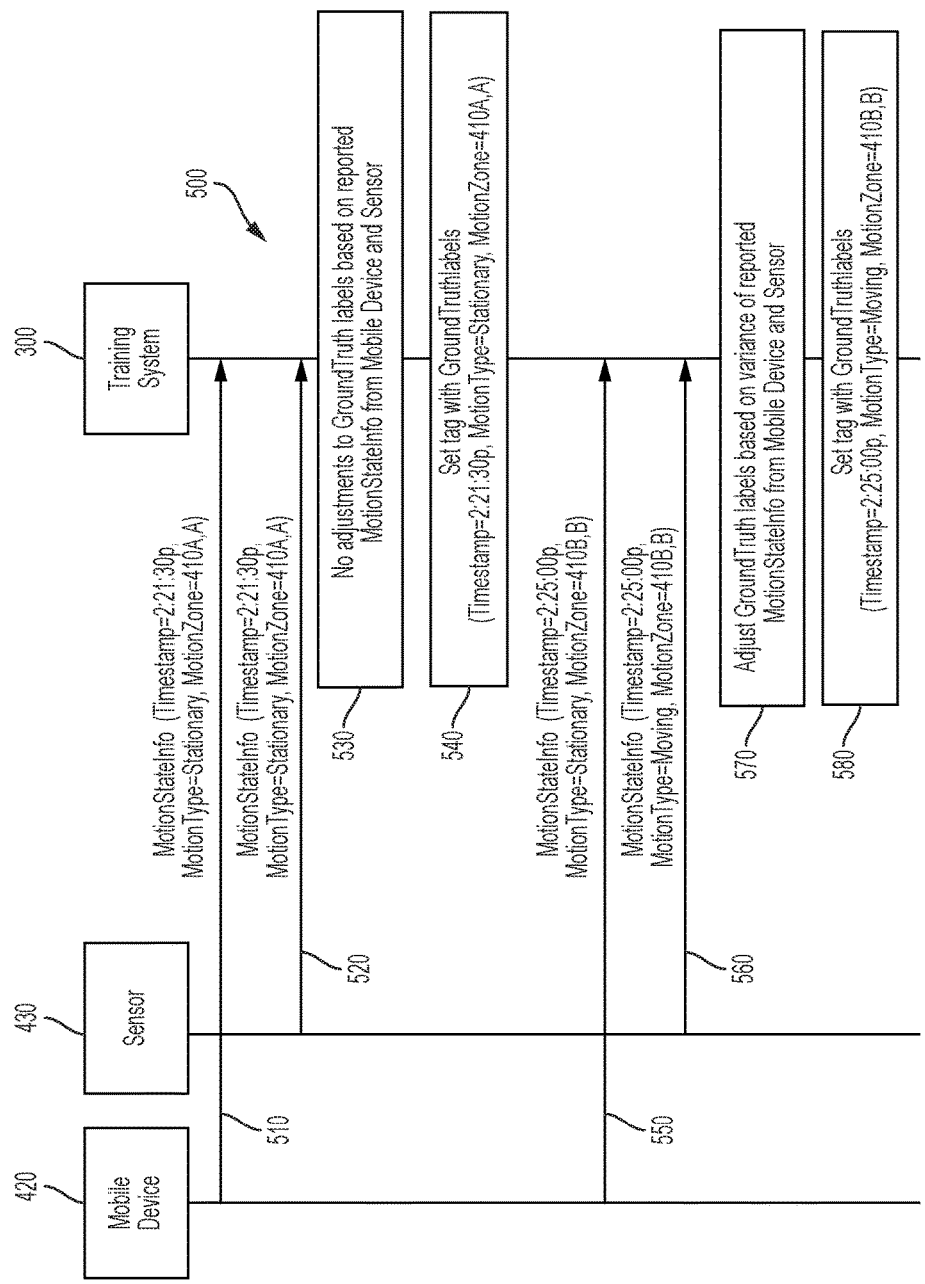
FIG. 5 is a sequence diagram showing processing of training information collected in a wireless communication system.

FIG. 5 is a sequence diagram showing an example processing of collecting training information in a wireless communication system. This sequence diagram of FIG. 5A corresponds to an example of the collection of motion detection training by the mobile device 420 and sensor device 430 as shown in FIGS. 4A and 4B, which is then provided to the motion detection training system 300 illustrated in FIG. 3.

At 510, which corresponds with the data collection illustrated in FIG. 4A, mobile device 420 reports motion state information, e.g., labels 310B in FIG. 3, for a supervised training period. The motion state information may include, for example, a timestamp, a label MotionType indicating the user's type of movement, and a label MotionZone indicating where the location of the user. The motion state information may include additional or fewer information or labels depending on the type of training being performed. At 520, the sensor device 430 also provides corresponding motion state information, e.g., sensor data 310C, collected during the same supervised training period.

As shown in FIG. 5, the motion detection training system 300, e.g., data collection system 320, receives the data from mobile device 420 and sensor device 430 and analyzes the data for any conflicts or types of variances for the supervised training period. At 530, motion detection training system 300 determines that the motion data information provided by the user via mobile device 420 matches the motion data information provided by sensor device 430. In this particular example, the Timestamp=2:21:30p, the MotionType indicates stationary (e.g., the user is not moving), and the MotionZone indicates the location in the space 410 is A,A, (e.g., 410A,A). Therefore, no adjustments to the "ground truth" labels are necessary based on the reported motion state information from the mobile device 420 and sensor device 430. At 540, the motion detection training system 300 tags the channel information with the timestamp, motion type, and motion zone accordingly, e.g., Timestamp=2:21:30, MotionType=Stationary, MotionZone=410A,A.

At 550, which corresponds with the data collection illustrated in FIG. 4B, mobile device 420 reports motion state information, e.g., labels 310B in FIG. 3, for a supervised training period. At 560, the sensor device 430 also provides corresponding motion state information, e.g., sensor data 310C, collected during the same supervised training period.

As shown in FIG. 5, the motion detection training system 300, e.g., data collection system 320, receives the data from mobile device 420 and sensor device 430 and analyzes the data for any conflicts or other variances for the supervised training period. At 580, motion detection training system 300 determines a conflict between the motion data information provided by the user via mobile device 420 and the motion data information provided by sensor device 430. In this example, the mobile device 420 and sensor device 430 provide information including a timestamp, a label MotionType indicating the user's type of movement, and a label MotionZone, e.g., indicating where the location of the user.

In this case, the timestamp, Timestamp=2:25:00p, and the MotionZone=410B,B, collected by mobile device 420 and sensor device 430 and received by the motion detection training system 300 are the same and therefore do not conflict. However, the mobile device 420 reports that the user is not moving, e.g., MotionType=stationary, while the sensor device reports that the user is moving, e.g., MotionType=Moving. In this case, the information provided by the sensor device may be deemed to be more accurate than the user-provided information. At 570, the motion detection training system 300 detects the variance between the motion data information reported by the mobile device 420 and the sensor device 430 and adjusts the user-provided motion type label to the sensor device reading, e.g., MotionType=Moving. At 580, the motion detection training system 300 tags the channel information with the corrected labels, including timestamp, motion type, and motion zone accordingly, e.g., Timestamp=2:25:00p, MotionType=Moving, MotionZone=410A,A. In other cases, the motion detection training system 300 may choose to resolve the conflict in motion information received from mobile device 420 and sensor device 430 in another manner. For example, rather than correcting the "ground truth" labels, motion detection training system 300 may choose to discard all data associated with the supervised training period, e.g., if motion detection training system 300 determines the conflict cannot be resolved while maintaining motion information integrity. This may occur when, in the previous example, motion detection training system 300 was training for a "no motion" motion type but the user was, in fact, moving based on the sensor data. In that case, the wireless channel information collected would also be inaccurate since the user was moving. However, if the motion detection training system 300 was training for a "motion" motion type but the user inadvertently labeled the motion type as MotionType=stationary, then in this case, it may be appropriate for the motion detection training system 300 to correct the "ground truth" labels as shown in 570 of FIG. 5, and at 540, the motion detection training system 300 tags the channel information with the timestamp, motion type, and motion zone accordingly, e.g., Timestamp=2:25:00, MotionType=Moving, MotionZone=410B,B.

The motion information collected and reported in FIG. 5 may include other types of motion information or labels. For example, the motion information provided based on user input to the mobile device or collected from the sensor device may include any type of information or data label that may be used by motion detection training system 300 to more accurately identify and detect motion in a space. In some cases, motion detection training system 300 may introduce new motion types, zones or locations, categories of motion, and gestures, and the corresponding types of data may be collected for training the system.

The motion detection training system 300 may analyze the received motion data for various other types of conflicts. For example, the variance may be detected between the timestamp when the activity to be measured started indicated. In this type of situation, a sensor device may show that the user began moving prior to the timestamp registered by the user. In that instance, the user may have delayed entering the starting time causing the variance with the sensor data, and data collection system 320 may elect to correct the time label. In another example, sensor 430 may collect data indicating the user was in location B-B of space 410 in FIG. 4A, e.g., the kitchen, while the user-provided label indicates a different location A-A, e.g., the living room. In that case, data collection system 320 may detect the variance and correct the motion data in favor of the sensor data. In some cases, a sensor device may provide supplemental information not provided by user data input. For example, sensors may collect and provide data about direction, speed, number of steps, etc. which motion detection training system 300 may be used to augment the motion data provided by user-provided labels. The additional information can be added to the motion information and used to tag associated with the corresponding channel information.

Figure 6A:
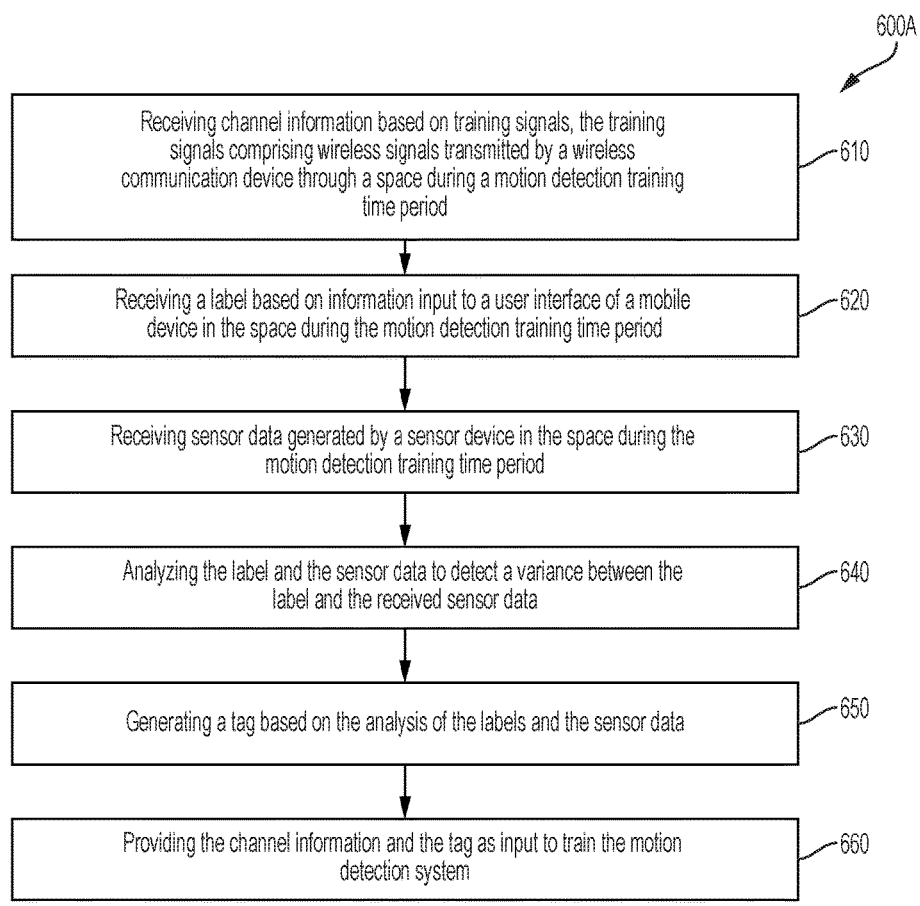
FIGS. 6A and 6B are flow diagrams showing an example process for motion detection training in a wireless communication system.
Figure 6B:
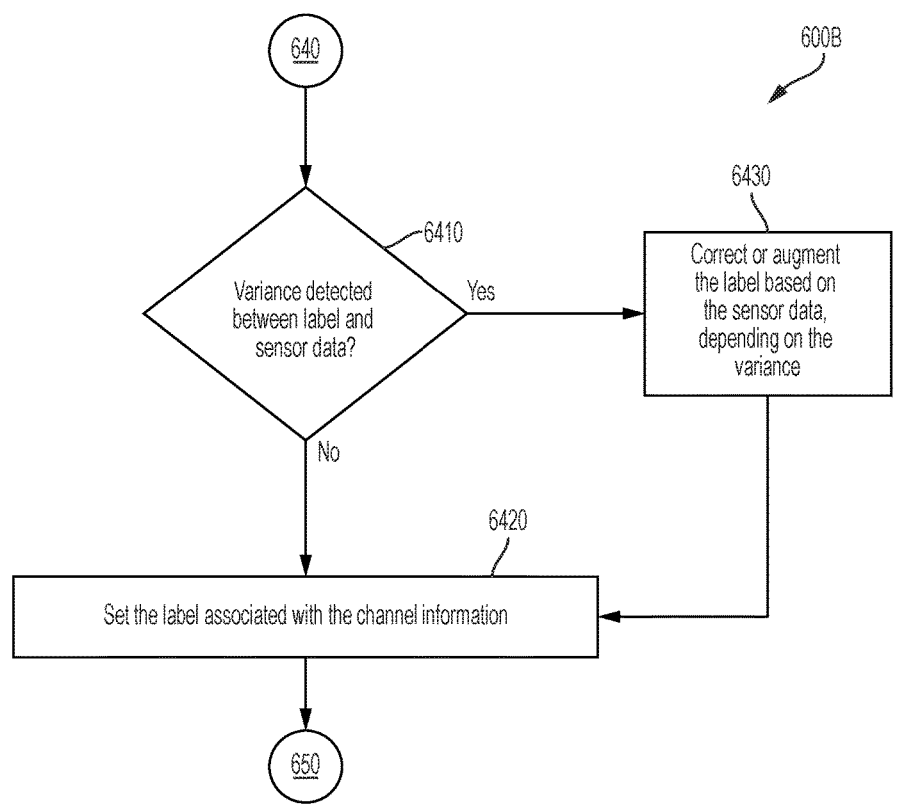

FIGS. 6A and 6B are a flow diagram showing example process 600A and 600B, respectively, for motion detection training in a wireless communication system. Operations of the processes 600a and 600B may be performed by one or more processors of a device that is included in or coupled to a wireless network that serves the space. For example, operations in the example processes 600A and 600B may be performed by the example data collection system 320 in FIG. 3, or by one the example wireless communication devices 102 in FIG. 1 configured to collect motion state information from sensor devices to create "ground truth" labels for training a motion detection system. The example processes 600A and 600B may include additional or different operations, and the operations may be performed in the order shown or in another order. In some cases, one or more of the operations shown in FIGS. 6A and 6B are implemented as processes that include multiple operations, sub-processes or other types of routines. In some cases, operations can be combined, performed in another order, performed in parallel, iterated, or otherwise repeated or performed another manner.

As shown in FIG. 6A, at 610, channel information based on training signals is received. The training signals include wireless signals transmitted by a wireless communication device through a space during a motion detection training time period. For example, FIG. 2A illustrates training signals being sent at a first time and FIG. 2B illustrates training signals being sent at a subsequent time during a motion detection training time period. Channel information, e.g., channel information 310A, based on the training signals in each training time period can be provided to the motion detection training system 300, as described with respect to FIG. 3. At 620, one or more labels may be received based on information input to a user interface of a mobile device in the space during the motion detection training time period. At 630, sensor data, generated by a sensor device in the space during the motion detection training time period, may also be received. For example, FIGS. 4A and 4B illustrate a mobile device 420 generating labels based on user input and a sensor device 430 collecting motion data during supervised training at two different times in a motion detection training time period. The data labels, e.g., labels 310B, and sensor data, e.g., sensor data 310C are provided to the motion detection training system 300 as illustrated in FIG. 3. The sensor device may include any of an accelerometer, a gyroscope, a compass, a pedometer, and a barometer. In some cases, the mobile device includes the sensor device.

At 640, the one or more labels and the sensor data are analyzed to detect a variance between the user-provided label and the received sensor data. For example, the data collection system 320 of the motion detection training system 300 may receive the training data (channel information 310A, labels 310B, sensor data 310C) and analyze the data to detect the variances. In some cases, a variance is detected when the analysis indicates that the sensor data does not match the label. In that case, the label may either be corrected based on the received sensor data, or the label may be augmented with the received sensor data, depending on the variance detected. In some cases, the variance between the label and the sensor data may include a difference between a timestamp in the label and a timestamp in the sensor data, a difference between a type of measurement indicated in the label and a type of measurement in the sensor data, or may be additional information provided in the sensor data but not the label. In an example, if the variance detected is between the timestamp provide by the user and the timestamp provided by the sensor, then the ground truth data may be corrected with the sensor timestamp. In the example in FIG. 5, the variance detected is between the type of measurement indicated in the label, e.g., MotionType=stationary, and the type of motion detected in the sensor data, e.g., MotionType moving. In some cases, the ground truth label may be corrected based on the sensor data, e.g., in FIG. 5, the ground truth label is corrected. In some instances when a variance may cause channel information to be tagged incorrectly, all the data associated with that training measurement may be discarded.

At 650, a tag may be generated based on the analysis of the labels and the sensor data. In some cases, generating the tag based on the analysis of the label and the sensor data improves accuracy of the tag compared to generating the tag only from the label. At 660, the channel information and the tag are provided as input to train the motion detection system. For example, the data collection system 320 may tag channel information, e.g., tagged channel information data 330, and provide it to the motion detection trainer 340. In some cases, tagged channel information data 330 is provided to a machine learning system that includes the motion detection trainer 340 and the neural network 350. In some cases, the tag may indicate whether motion occurred in the space during the training time period, a direction of motion that occurred in the space during the training time period, a location of motion that occurred in the space during the training time period, or a time at which motion occurred in the space during the training time period FIG. 6B is a flow diagram showing an example process 600B for analyzing one or more user provided labels and sensor data. At 6410, it is determined whether a variance is detected between the one or more user-provided labels, e.g., labels 310B, and sensor data, e.g., sensor data 3100. If no variance is detected during analysis, at 6420, the one or more labels associated with the channel information are set, e.g., this data may be used when generating a tag for the channel information in step 650 of FIG. 6A. If a variance is detected, then at 6430, the one or more user labels are corrected or augmented based on the sensor data, depending on the variance. After correction or augmentation, at 6420, the one or more labels associated with the channel information are set, and are used to generate a tag for the channel information in step 650 of FIG. 6A.

Figure 7:
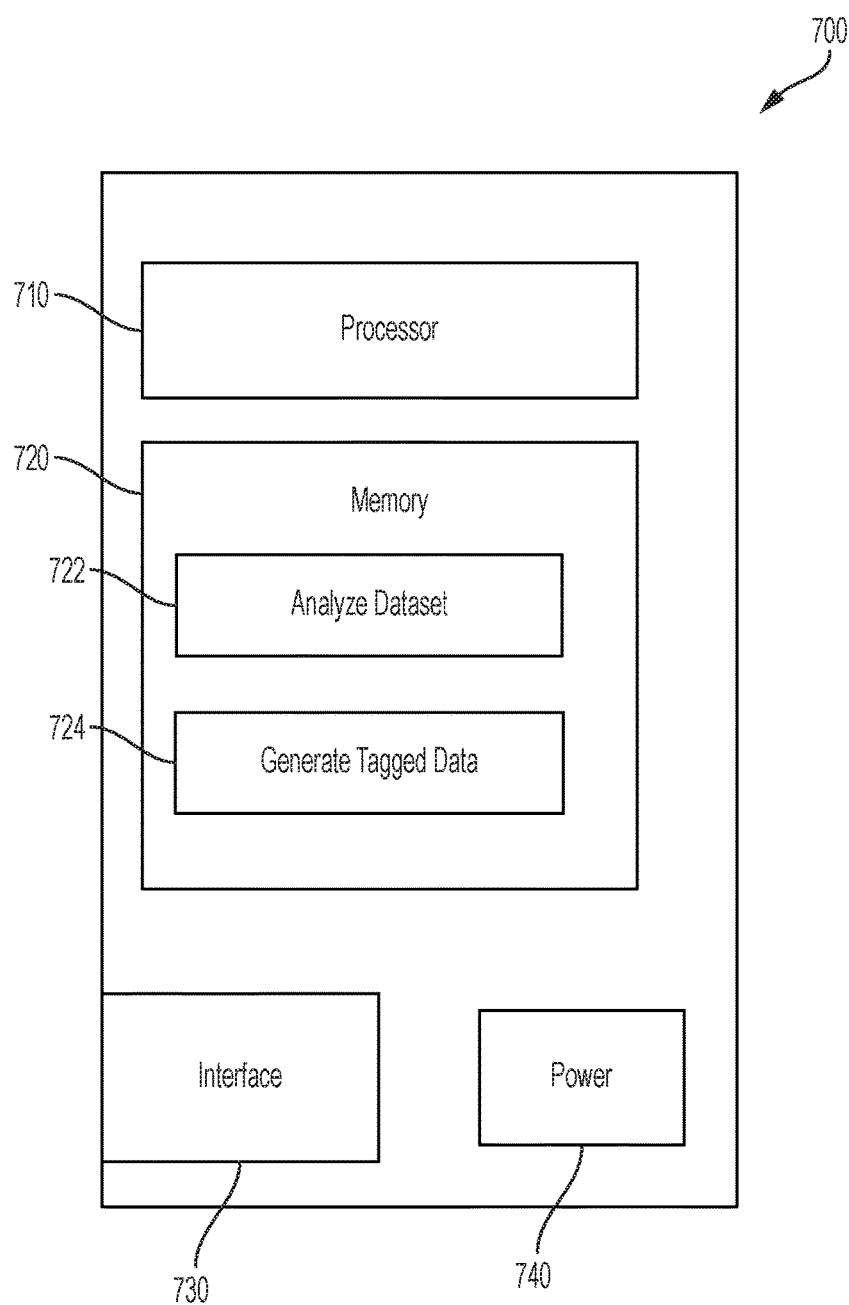
FIG. 7 is a block diagram showing an example node device.

FIG. 7 is a block diagram showing an example node device 700. As shown in FIG. 7, the example node device 700 includes interface 730 for transmission and/or reception of data and/or signals, a processor 710, a memory 720, and a power unit 740. For example, a node device 700 may be, include or be included in any of the wireless communication devices 102A, 102B, 102C in the wireless communication system 100 illustrated in FIG. 1, a data collection system 320 or other subsystem of the motion detection training system 300 in FIG. 3, mobile device 420 or sensor device 430 in FIGS. 4A-4B. Each of these types of devices may include the same, additional or different components of node device 700, and the components may be configured to operate as shown in FIG. 1, FIG. 3, FIG. 4A-4B, or in another manner. In some implementations, the interface 730, processor 710, memory 720, and power unit 740 of a node device are housed together in a common housing or other assembly. In some implementations, one or more of the components of a wireless communication device can be housed separately, for example, in a separate housing or other assembly.

The example interface 730 can communicate (receive, transmit, or both) wireless signals or wired signals. For example, the interface 730 may be implemented as a wired or wireless interface, or may be implemented in another manner, for example, with other types of components or subsystems. For example, the interface 730 may be a network interface configured to communicate signals via physical ports over ethernet, fiber, cable, or other types of physical media. In another example, interface 730 may be configured to communicate radio frequency (RF) signals formatted according to a wireless communication standard (e.g., Wi-Fi or Bluetooth). In some cases, an interface 730 of node device 700, e.g., data collection system 320, may be configured to receive channel information 310A, data labels 310B, and sensor data 310C, as illustrated in FIG. 3. In some instances, the interface 730 of the node device 700 may be configured to provide, or transmit, tagged channel information data 330 to another node device of the motion detection training system 300, e.g., motion detection trainer 340 shown in FIG. 3.

In some cases, the example interface 730 may be implemented as a modem. In some implementations, the example interface 730 includes a radio subsystem and a baseband subsystem. In some cases, the baseband subsystem and radio subsystem can be implemented on a common chip or chipset, or they may be implemented in a card or another type of assembled device. The baseband subsystem can be coupled to the radio subsystem, for example, by leads, pins, wires, or other types of connections. In some cases, a radio subsystem in the interface 730 can include one or more antennas and radio frequency circuitry. The radio frequency circuitry can include, for example, circuitry that filters, amplifies or otherwise conditions analog signals, circuitry that up-converts baseband signals to RF signals, circuitry that down-converts RF signals to baseband signals, etc. Such circuitry may include, for example, filters, amplifiers, mixers, a local oscillator, etc. The radio subsystem can be configured to communicate radio frequency wireless signals on the wireless communication channels. As an example, the radio subsystem may include a radio chip, an RF front end, and one or more antennas. A radio subsystem may include additional or different components. In some implementations, the radio subsystem can be or include the radio electronics (e.g., RF front end, radio chip, or analogous components) from a conventional modem, for example, from a Wi-Fi modem, pico base station modem, etc. In some implementations, the antenna includes multiple antennas.

In some cases, a baseband subsystem in the interface 730 can include, for example, digital electronics configured to process digital baseband data. As an example, the baseband subsystem may include a baseband chip. A baseband subsystem may include additional or different components. In some cases, the baseband subsystem may include a digital signal processor (DSP) device or another type of processor device. In some cases, the baseband system includes digital processing logic to operate the radio subsystem, to communicate wireless network traffic through the radio subsystem, to detect motion based on motion detection signals received through the radio subsystem or to perform other types of processes. For instance, the baseband subsystem may include one or more chips, chipsets, or other types of devices that are configured to encode signals and deliver the encoded signals to the radio subsystem for transmission, or to identify and analyze data encoded in signals from the radio subsystem (e.g., by decoding the signals according to a wireless communication standard, by processing the signals according to a motion detection process, or otherwise).

In some instances, the radio subsystem in the example interface 730 receives baseband signals from the baseband subsystem, up-converts the baseband signals to radio frequency (RF) signals, and wirelessly transmits the radio frequency signals (e.g., through an antenna). In some instances, the radio subsystem in the example interface 730 wirelessly receives radio frequency signals (e.g., through an antenna), down-converts the radio frequency signals to baseband signals, and sends the baseband signals to the baseband subsystem. The signals exchanged between the radio subsystem and the baseband subsystem may be digital or analog signals. In some examples, the baseband subsystem includes conversion circuitry (e.g., a digital-to-analog converter, an analog-to-digital converter) and exchanges analog signals with the radio subsystem. In some examples, the radio subsystem includes conversion circuitry (e.g., a digital-to-analog converter, an analog-to-digital converter) and exchanges digital signals with the baseband subsystem.

In some cases, the interface 730 can communicate wireless network traffic (e.g., data packets) in a wireless communication network and may also transmit or receive (or both) signals (e.g., motion probe signals). In some instances, the interface 730 generates motion probe signals for transmission, for example, to probe a space to detect motion or lack of motion. In some implementations, the motion probe signals include standard signaling or communication frames that include standard pilot signals used in channel sounding (e.g., channel sounding for beamforming according to the IEEE 802.11ac-2013 standard). In some cases, the motion probe signals include reference signals known to all devices in the network. In some instances, the interface 730 may process received signals, for example, to detect motion of an object in a space, lack of motion in the space, or presence or absence of an object in the space when lack of motion is detected. For example, the interface 730 may analyze aspects of standard signaling protocols (e.g., channel sounding for beamforming according to the IEEE 802.11ac-2013 standard, such as, based on the steering or other matrix generated) to detect changes in the channel as a result of motion in the space.

The example processor 710 can execute instructions, for example, to generate output data based on data inputs. The instructions can include programs, codes, scripts, modules, or other types of data stored in memory 720. Additionally or alternatively, the instructions can be encoded as pre-programmed or re-programmable logic circuits, logic gates, or other types of hardware or firmware components or modules. The processor 710 may be or include a general-purpose microprocessor, as a specialized co-processor or another type of data processing apparatus. In some cases, the processor 710 performs high level operation of the node device 700. For example, the processor 710 may be configured to execute or interpret software, scripts, programs, functions, executables, or other instructions stored in the memory 720. In some implementations, the processor 710 be included in the interface 730. In some cases, the processor 710 may execute instructions that cause the node device to perform the method of FIGS. 6A and 6B. For example, processor 710 may cause the node device to receive channel information based on training signals, receive a label based on information input to a user interface of a mobile device in the space during the motion detection training time period, receive sensor data collected by a sensor device in the space during the motion detection training time period, analyze the label and the sensor data to detect a variance between the label and the sensor data, generate a tag based on the analysis of the label and the sensor data, and provide the channel information and the tag as training input to train the motion detection system.

The example memory 720 may include computer-readable storage media, for example, a volatile memory device, a non-volatile memory device, or both. The memory 720 may include one or more read-only memory devices, random-access memory devices, buffer memory devices, or a combination of these and other types of memory devices. In some instances, one or more components of the memory can be integrated or otherwise associated with another component of the node device 700. The memory 720 may store instructions that are executable by the processor 710. For example, the instructions may include instructions for analyzing a label and sensor data to detect a variance between the label and the received sensor data, and to generate a tag based on the analysis of the labels and the sensor data, as described in the example process 600A shown in FIG. 6A and example process 600B shown in FIG. 6B. In some instances, the memory 720 may include instructions (722) to analyze a dataset for analyzing the label and sensor data and instructions (744) to generate tagged data. In some cases, the memory 720 may include additional instructions, for example, instructions for training, executing, or otherwise operating or modifying a motion detection system.

The example power unit 740 provides power to the other components of the node device 700. For example, the other components may operate based on electrical power provided by the power unit 740 through a voltage bus or other connection. In some implementations, the power unit 740 includes a battery or a battery system, for example, a rechargeable battery. In some implementations, the power unit 740 includes an adapter (e.g., an AC adapter) that receives an external power signal (from an external source) and coverts the external power signal to an internal power signal conditioned for a component of the node device 700. The power unit 740 may include other components or operate in another manner.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus, such as, module 722 for analyzing a dataset and module 724 for generating tagged data. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, a data collected by one or more sensor may be used to correct or augment user-provided motion state information during supervised training of a motion detection system.

In a first example, channel information based on training signals is received. The training signals include wireless signals transmitted by a wireless communication device through a space during a motion detection training time period. One or more labels may be received based on information input to a user interface of a mobile device in the space during the motion detection training time period. Sensor data, generated by a sensor device in the space during the motion detection training time period, may also be received. The one or more labels and the sensor data are analyzed to detect a variance between the label and the received sensor data. A tag is generated based on the analysis of the labels and the sensor data. The channel information and the tag are provided as input to train the motion detection system. In some cases, tagged channel information is provided to a machine learning system. In some cases, the tag may indicate whether motion occurred in the space during the training time period, a direction of motion that occurred in the space during the training time period, a location of motion that occurred in the space during the training time period, or a time at which motion occurred in the space during the training time period In a second example, a computer-readable storage medium stores instructions that are operable when executed by a data processing apparatus to perform one or more operations of the first example.

In a third example, a monitoring system includes one or more processors and a memory storing instructions that are operable when executed by the one or more processors to perform one or more operations of the first example.

Implementations of the first, second, and third examples may include one or more of the following features. The sensor device may include any of an accelerometer, a gyroscope, a compass, a pedometer, and a barometer. The mobile device includes the sensor device. A variance is detected when the analysis indicates that the sensor data does not correspond to the label, and the label may either be corrected based on the received sensor data, or the label may be augmented with the received sensor data, depending on the variance detected. The variance between the label and the sensor data includes at least one of a difference between a timestamp in the label and a timestamp in the sensor data, a difference between a type of measurement indicated in the label and a type of measurement in the sensor data, or may be additional information provided in the sensor data but not the label. Generating the tag based on the analysis of the label and the sensor data improves accuracy of the tag compared to generating the tag only from the label. A tagged channel information is provided to a machine learning system. The tag may indicate whether motion occurred in the space during the training time period, a direction of motion that occurred in the space during the training time period, a location of motion that occurred in the space during the training time period, or a time at which motion occurred in the space during the training time period.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A motion detection training method comprising:
   receiving, by one or more processors of a data processing apparatus, channel information based on training signals, the training signals comprising wireless signals transmitted by a wireless communication device through a space between the wireless communication device and a second wireless communication device during a motion detection training time period supervised by a user;
   receiving, by the one or more processors of the data processing apparatus, a label comprising a first set of motion information input to a user interface by the user of a mobile device in the space during the motion detection training time period;
   receiving, by the one or more processors of the data processing apparatus, sensor data comprising a second set of motion information collected by a wearable sensor device of the user in the space during the motion detection training time period;
   analyzing, by the one or more processors of the data processing apparatus, the label and the sensor data to detect a variance between the label and the sensor data for the motion detection training time period, wherein analyzing the label and the sensor data comprises:
      detecting the variance when the analysis indicates that the sensor data does not correspond to the label; and
      either correcting the label based on the received sensor data, or augmenting the label with the received sensor data, depending on the variance detected;
   generating, by the one or more processors of the data processing apparatus, a tag for the channel information based on the analysis of the label and the sensor data; and
   providing, by the one or more processors of the data processing apparatus, the channel information and the tag as training input to train a motion detection system.

2. The motion detection training method of claim 1, wherein generating the tag based on the analysis of the label and the sensor data improves accuracy of the tag compared to generating the tag only from the label.

3. The motion detection training method of claim 1, wherein the sensor device comprises at least one of:
   an accelerometer;
   a gyroscope;
   a compass;
   a pedometer; and
   a barometer.

4. The motion detection training method of claim 1, wherein the mobile device comprises the sensor device.

5. The motion detection training method of claim 1, wherein the variance between the label and the sensor data comprises at least one of:
   a difference between a timestamp in the label and a timestamp in the sensor data;
   a difference between a type of measurement indicated in the label and a type of measurement in the sensor data; or
   additional information provided in the sensor data but not the label.

6. The motion detection training method of claim 1, wherein providing the channel information and the tag as training input to train the motion detection system comprises providing a tagged channel information to a machine learning system.

7. The motion detection training method of claim 6, wherein the tag indicates at least one of:
   whether motion occurred in the space during the motion detection training time period;
   a direction of motion that occurred in the space during the motion detection training time period;
   a location of motion that occurred in the space during the motion detecting training time period; or
   a time at which motion occurred in the space during the motion detection training time period.

8. A motion detection training system comprising:
   one or more processors;
   memory storing instructions that, when executed by the one or more processors, cause the one or more processors to:
      receive channel information based on training signals, the training signals comprising wireless signals transmitted by a wireless communication device to a second wireless communication device through a space during a motion detection training time period supervised by a user;

receive a label comprising a first set of motion information input to a user interface by the user of a mobile device in the space during the motion detection training time period;

receive sensor data comprising a second set of motion information collected by a wearable sensor device of the user in the space during the motion detection training time period; wherein analyzing the label and the sensor data comprises:

detecting the variance when the analysis indicates that the sensor data does not correspond to the label; and either correcting the label based on the received sensor data, or augmenting the label with the received sensor data, depending on the variance detected;

analyze the label and the sensor data to detect a variance between the label and the sensor data for the motion detection training time period;

generate a tag for the channel information based on the analysis of the label and the sensor data; and provide the channel information and the tag as training input to train a motion detection system.

9. The motion detection training system of claim 8, wherein generating the tag based on the analysis of the label and the sensor data improves accuracy of the tag compared to generating the tag only from the label.

10. The motion detection training system of claim 8, wherein the sensor device comprises at least one of:
an accelerometer;
a gyroscope;
a compass;
a pedometer; and
a barometer.

11. The motion detection training system of claim 8, wherein the mobile device comprises the sensor device.

12. The motion detection training system of claim 8, wherein the variance between the label and the sensor data comprises at least one of:
a difference between a timestamp in the label and a timestamp in the sensor data;
a difference between a type of measurement indicated in the label and a type of measurement in the sensor data; or
additional information provided in the sensor data but not the label.

13. The motion detection training system of claim 8, wherein providing the channel information and the tag as training input to train the motion detection system comprises providing a tagged channel information to a machine learning system.

14. The motion detection training system of claim 13, wherein the tag indicates at least one of:
whether motion occurred in the space during the motion detection training time period;
a direction of motion that occurred in the space during the motion detection training time period;
a location of motion that occurred in the space during the motion detection training time period; or
a time at which motion occurred in the space during the motion detection training time period.

15. A non-transitory computer readable medium comprising instructions that when executed by data processing apparatus cause the data processing apparatus to perform operations comprising:

receiving channel information based on training signals, the training signals comprising wireless signals transmitted by a wireless communication device to a second wireless communication device through a space during a motion detection training time period supervised by a user;

receiving a label comprising a first set of motion information input to a user interface by the user of a mobile device in the space during the motion detection training time period;

receiving sensor data comprising a second set of motion information collected by a wearable sensor device of the user in the space during the motion detection training time period;

analyzing the label and the sensor data to detect a variance between the label and the sensor data for the motion detection training time period, wherein analyzing the label and the sensor data comprises:

detecting the variance when the analysis indicates that the sensor data does not correspond to the label; and either correcting the label based on the received sensor data, or augmenting the label with the received sensor data, depending on the variance detected;

generating a tag for the channel information based on the analysis of the label and the sensor data; and providing the channel information and the tag as training input to train a motion detection system.

16. The computer readable medium of claim 15, wherein generating the tag based on the analysis of the label and the sensor data improves accuracy of the tag compared to generating the tag only from the label.

17. The computer readable medium of claim 15, wherein the sensor device comprises at least one of:
an accelerometer;
a gyroscope;
a compass;
a pedometer; and
a barometer.

18. The computer readable medium of claim 15, wherein the mobile device comprises the sensor device.

19. The computer readable medium of claim 15, wherein the variance between the label and the sensor data comprises at least one of:
a difference between a timestamp in the label and a timestamp in the sensor data;
a difference between a type of measurement indicated in the label and a type of measurement in the sensor data; or
additional information provided in the sensor data but not the label.

20. The computer readable medium of claim 15, wherein providing the channel information and the tag as training input to train the motion detection system comprises providing a tagged channel information to a machine learning system.

21. The computer readable medium of claim 20, wherein the tag indicates at least one of:
whether motion occurred in the space during the motion detection training time period;
a direction of motion that occurred in the space during the motion detection training time period;
a location of motion that occurred in the space during the motion detection training time period; or
a time at which motion occurred in the space during the motion detection training time period.

* * * * *

UNITED STATES PATENT AND TRADEMARK OFFICE
CERTIFICATE OF CORRECTION

PATENT NO. : 10,318,890 B1
APPLICATION NO. : 15/987805
DATED : June 11, 2019
INVENTOR(S) : Kravets et al.

Page 1 of 1

It is certified that error appears in the above-identified patent and that said Letters Patent is hereby corrected as shown below:

In the Specification

Column 10, Line 64, delete "3100" and insert -- 310C -- therefor.

Column 11, Lines 60-65, delete "$a_{i+1} = b + \Sigma_j w_{i,j} a_{i,j}$" and insert -- $a_{i+1} = b + \Sigma_j w_{i,j} a_{i,j}$ -- therefor.

Column 12, Lines 4-6, delete "$C = -\frac{1}{n}\sum_i \sum_j [y_{j(i)} * \ln(a^L_{j(i)}) + (1 - y_{j(i)}) * \ln(1 - a^L_{j(i)})].$" and insert -- $C = -\frac{1}{n}\sum_i \sum_j [y_{j(i)} * ln(a^L_{j(i)}) + (1 - y_{j(i)}) * ln(1 - a^L_{j(i)})]$. -- therefor.

Column 17, Line 42, delete "3100." and insert -- 310C. -- therefor.

In the Claims

Column 24, Claim 7, Line 57, delete "detecting" and insert -- detection -- therefor.

Column 25, Claim 8, Line 11, delete "period;" and insert -- period, -- therefor.

Signed and Sealed this
Twelfth Day of November, 2019

Andrei Iancu
*Director of the United States Patent and Trademark Office*